I. A. BRADDOCK.
APPARATUS FOR TREATING ORES.
APPLICATION FILED JUNE 18, 1910.
988,437.
Patented Apr. 4, 1911.
2 SHEETS—SHEET 2.
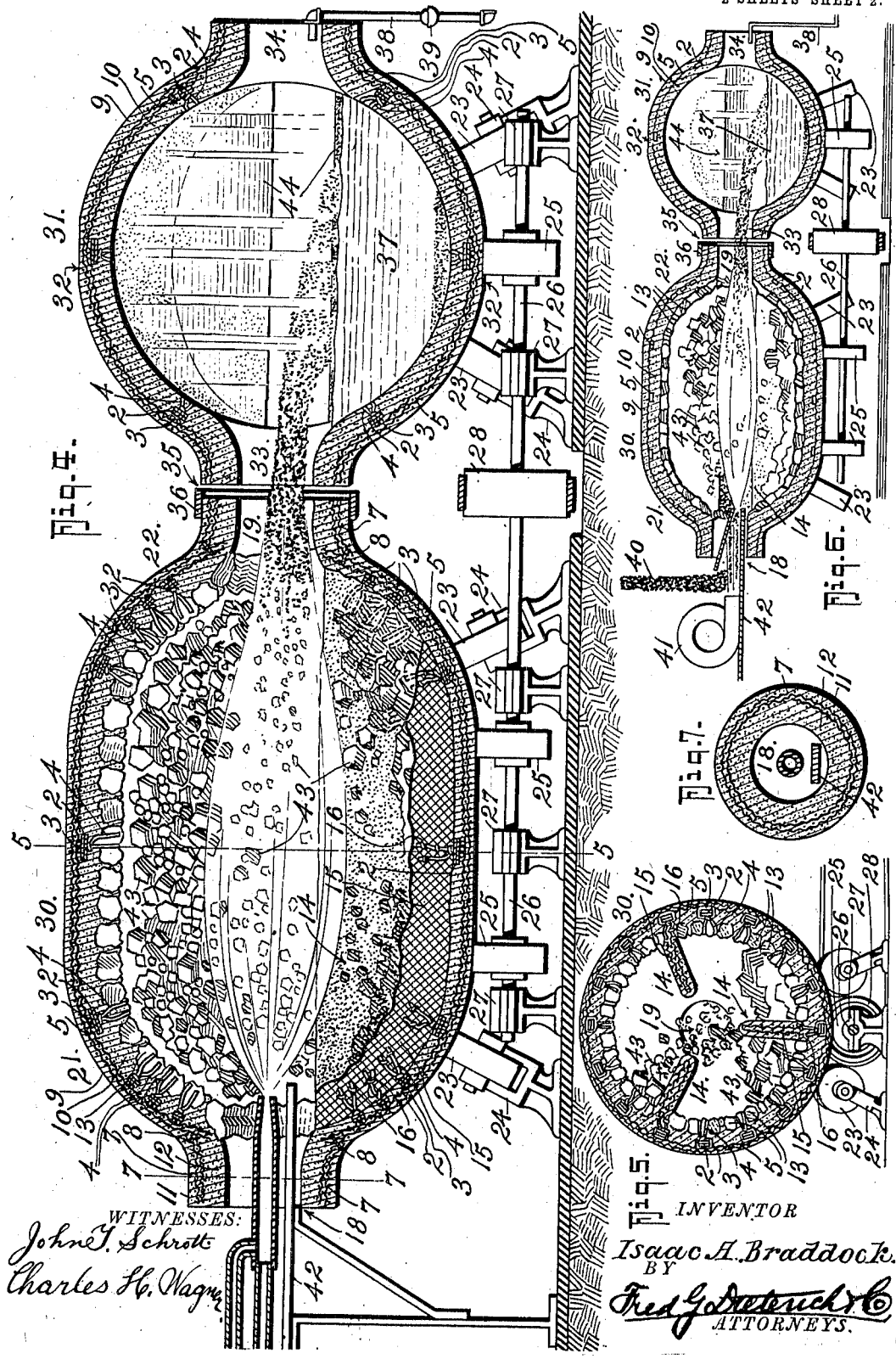
WITNESSES:
John T. Schrott
Charles H. Wagner
INVENTOR
Isaac A. Braddock.
BY
Fred G. Dieterich & Co.
ATTORNEYS.

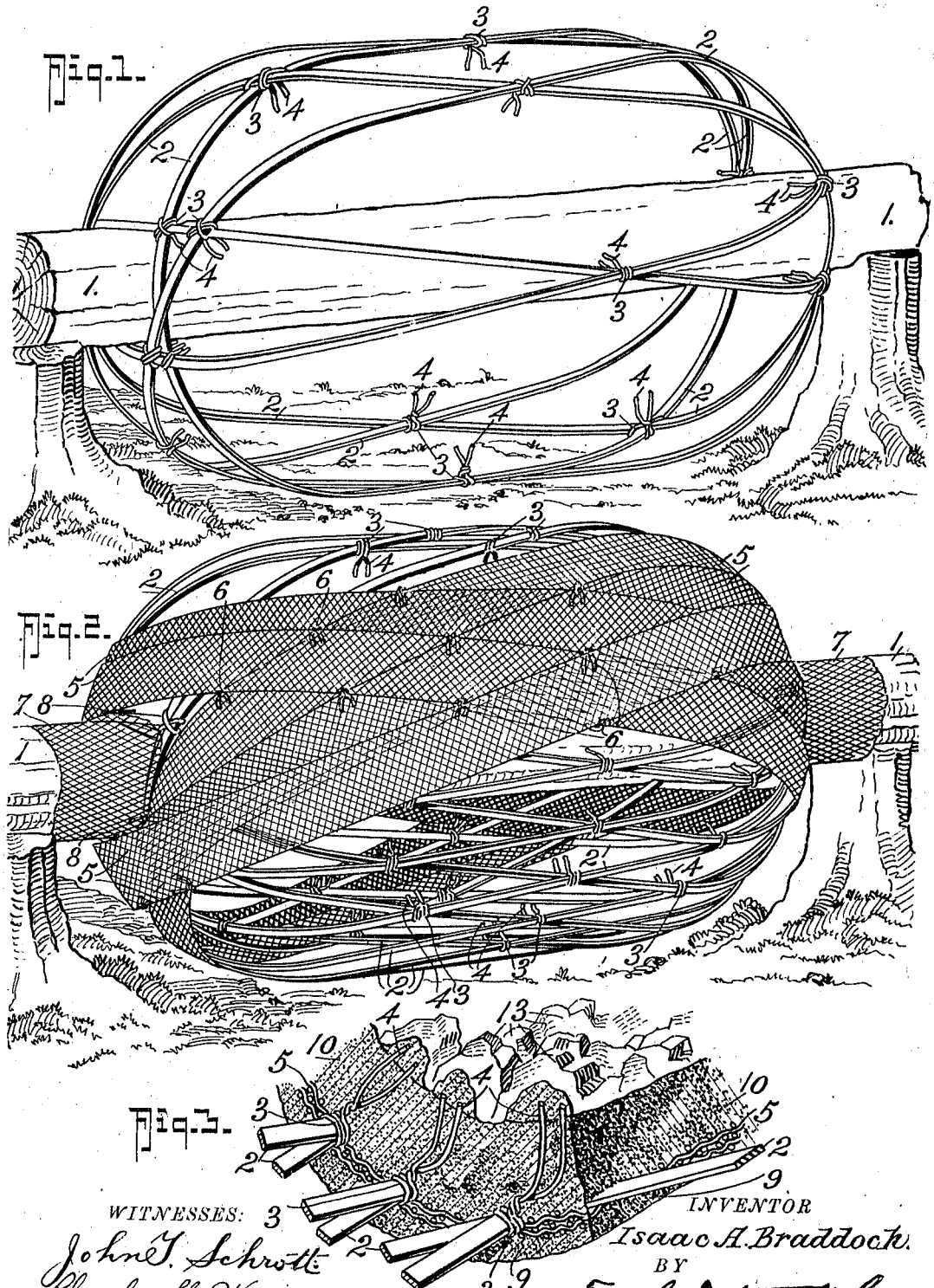

UNITED STATES PATENT OFFICE.

ISAAC A. BRADDOCK, OF HADDONFIELD, NEW JERSEY, ASSIGNOR OF ONE-SIXTH TO WILLIAM C. CODD, OF BALTIMORE, MARYLAND, AND ONE-SIXTH TO NICHOLAS A. KESTLER AND ONE-SIXTH TO DAVID E. ANTHONY, OF WASHINGTON, DISTRICT OF COLUMBIA.

APPARATUS FOR TREATING ORES.

988,437.

Specification of Letters Patent.

Patented Apr. 4, 1911.

Application filed June 18, 1910. Serial No. 567,572.

*To all whom it may concern:*

Be it known that I, ISAAC A. BRADDOCK, residing at Haddonfield, in the county of Camden and State of New Jersey, have invented certain new and useful Improvements in Apparatus for Treating Ores, of which the following is a specification.

In the treatment of metalliferous ores, particularly those bearing precious metals, the crude ore as mined is either first roasted (if it be a sulfid ore) or passed through crushers to break the ore into small particles, after which the same is further crushed or pulverized, usually in the presence of water to dissolve out the soluble impurities and cause the heavier metal particles to precipitate. The crushed ore thus treated with water is passed over amalgamators, separating tables or into chemical baths, depending upon the nature of the ore and the desired final product. In other words, the crushed and powdered ore has the values separated therefrom either by mechanical means, chemical means, electro-chemical means, or a combination of all of these means, depending upon the nature of the materials to be obtained.

In those processes in which the crushed or pulverized ore is treated with water the precipitate is usually the richest in ore values, although a large part of the ore passes off with the slime and is usually lost. I am aware, however, that means have heretofore been suggested for recovering the values from slimes resultant in the wet treatment of ores, but the expense of such processes has usually been so high as to preclude their ecconomical performance. Furthermore the use of water in crushing mills often results in clogging the mill and otherwise impeding the operation thereof.

Therefore it is one of the prime objects of my invention to provide a means whereby the ores to be treated may have their water of crystallization and volatile products removed, at practically one and the same time, and then delivered as hot dry powder into a bath of suitable material for the separation of the ore values to be recovered without introducing steam or water to the ores prior to their introduction to the solvent or bath.

It is a further object of my invention to produce an apparatus in which the ores may be roasted, if such roasting is desired, and in which the ores, by a combined process of heating and crushing, are powdered and dried prior to their introduction into the treating bath.

Again, it is the object of my invention to provide an apparatus in which the heat of the ore dust stream will maintain the temperature of the solvent or bath up at a definite degree to assist the chemical re-actions; and whereby the hot ore stream (usually at a temperature of 500°) may be cooled just as it enters the solvent container by the admission of air to the stream in quantities as may be necessary to prevent the temperature of the solvent or bath rising above a predetermined degree, (usually 212° F.).

I furthermore provide an apparatus in which the hot blast, draft or stream serves as the vehicle for delivering the reduced and pulverized hot ore into the solvent bath.

Again, in practice, valuable ore deposits are found in remote mountainous regions, sometimes many miles from the usual modern facilities of transportation. This is principally true in the southwestern part of the United States and in Mexico, as well as in the Klondike region. If this ore could be treated at the mine and the ore values extracted at that place, even the mining of low grade ores would prove profitable. Attempts have heretofore been made to do this, but the great difficulty encountered in practice has been to convey the necessary machinery, such as crushing mills, pulverizers, separators, tanks, furnaces, etc., to the desired location. In the farthest regions of Mexico and the southwestern part of the United States the burro is the principle means of conveyance. This animal will usually carry a load of about 200 to 250 pounds, if properly packed on its back, yet it has been found practically impossible to transport the necessary machinery up steep and narrow mountain trails on burros, as must be done to reach a large number of otherwise valuable mines, owing to the fact that the machines at present on the market cannot, so far as I am aware be dismantled, "knocked-down" or separated into sufficiently small units to bring their weight below the maximum burden carrying capacity of a burro.

It is therefore another object of my invention to provide an apparatus that may be economically constructed at the place where it is to be used from material available at such place, or that may be readily conveyed to the locality by burros, or other pack animals.

Generically, my invention resides in providing a combined heating, reducing and crushing mill or container, and a solvent container constructed of metal hoops, bands or strips, which support a covering of bands of woven wire netting, the same being protected on the outside and inside by a wall of cement, concrete, clay or other like substance, and having further on the inside the crushing element (rocks which may be of the same ore that undergoes treatment, but preferably rocks of a harder material) which crushing elements are set by concrete, plaster, cement or otherwise, into the inner lining of the apparatus.

My invention also resides in providing an ore treating receptacle of spherical formation within, or having an inner chamber elongated and terminating in hemispherical ends in which the inlet and outlet openings are made so that as the container is turned on its axis (which runs from the inlet to the outlet) the moving material will rebound toward a central focal point or position, and be prevented from jumping out of the container through the openings therein, the receptacle having longitudinal lifting partitions to carry the ore around the central axis and drop it on the bottom of the receptacle.

In addition to the foregoing, my invention further resides in providing an apparatus in which the large ore chunks direct from the mine may be introduced, lifted and dropped through a hot blast or draft, whereby the volatile contents of the ore is driven off to cause the ore to decrepitate or become porous so that in dropping it will be pulverized by contact with the crusher lining of the container and may be further crushed by the larger harder particles of ore in rolling and tumbling in the container or mill.

My invention also provides means within the container whereby the ore may be lifted as the container is rotated on its axis and dropped from near the upper region of the container onto the bottom below in such manner that the rebounding tendency of the ore will be toward the center of the container rather than toward the openings in the ends and thus the material within the container will not prematurely leave the same.

In my apparatus, also the ore in dropping passes through the hot draft or stream, thereby causing the finely divided particles to be carried out of the container in which the heating and crushing operation takes place, and passed while hot into a receptacle containing the desired chemicals for the treatment of the ore (usually a cyanid solution where the ore to be recovered is a precious metal) thus maintaining the temperature of the solvent constant or practically so, and facilitating the chemical re-actions that occur, means being provided to cool (as may be necessary) the ore stream or blast and at the same time introduce oxygen into the passing stream of heated ore particles to assist in effecting the reduction before the ore stream enters the solution container.

This apparatus is especially designed for use in carrying out the process which forms the subject-matter of my co-pending application filed June 18, 1910, Ser. No. 567,573.

In this application I make no claim, *per se*, to the reinforced concrete structure as such herein described, as such forms the subject matter of my divisional application filed Aug. 19, 1910, Ser. No. 577,992.

Other objects of my invention will be apparent to those skilled in the art and the invention also resides in those novel details of construction, combination and arrangement which will be first fully described, then be specifically pointed out in the appended claims, and illustrated in the accompanying drawings, in which:

Figures 1 and 2 are perspective views illustrating the method of construction of the shell or casing of the receptacle, mill or solution container. Fig. 3, is a detail sectional perspective view of a part of the completed structure. Fig. 4, is a central vertical longitudinal section of my complete apparatus designed for use in connection with liquid fuel. Fig. 5, is a cross section on the line 5—5 of Fig. 4. Fig. 6, is a central vertical longitudinal section showing the arrangement of parts when brush wood, or other similar fuel is used. Fig. 7, is a cross section on the line 7—7 of Fig. 4.

In constructing my apparatus I take a suitable mandrel (when my invention is to be constructed at the mines the mandrel may be the trunk of a tree, or any other suitable thing that comes handy) and provide a set of hoops, rods, wires or bands 2 bent into the required shape and place them on the mandrel, as is indicated in Fig. 1 of the drawings, tying the same together by tie wires 3 wherever the hoops, etc., cross, with the ends 4 of the tie wires projecting inwardly. A sufficient number of hoops, etc., 2 (hereinafter termed the "frames") are used to afford the desired strength and support, upon which the frame cover 5 is wound. The cover 5 consists preferably of a band or strap of woven wire wound onto the frame, as shown in Fig. 2 of the drawings, in a manner similar to the way in which a ball of cord is wound around a stick. The cover 5 is tied together where desired, by tie wires 6 whose ends may also project inwardly. The mouths of the container are formed of a double thickness of woven wire 7 wound around the mandrel 1, and tied to the body portion by the wires 8.

After the frames 2 have been set up and tied, and after the covering 5 has been wound on and after the mouth tubes 7 have been wired in place, the mandrel 1 is removed in any desired way. When the mandrel is the trunk of a tree and it cannot be pulled out endwise, it may be burned out, if desired. An outer covering 9 of cement, plaster, or a mixture of cement and asbestos, or the like is placed on the frame covering 5 to a suitable thickness and a lining 10 is placed within the retort, which lining 10 is preferably thicker than the covering 9. The covering 9 and lining 10 form an outer and an inner wall for the container, and are united as an integral mass by the cement which passes through the interstices of the frame 2 and the frame covering 5 thus forming an integral structure of the frames 2, cover 5 and walls 9 and 10. The wire 7 is also covered and lined at 11 and 12 by a cover and lining of the same material as used for the cover 9 and lining 10 of the container proper. An inner lining 13 of rocks of any hard material such as flint, etc. (or when such material is not available, rocks of the ore to be treated may be used) is provided by cementing the rocks 13 to the inner wall 10 of the container, the ends 4 of the tje wires serving as final binding elements to assist in holding the rocks in place. These rocks form the crushers or crushing surface against which the ore is dropped or pounded to effect its pulverization in a manner more clearly set forth hereinafter.

Suitable longitudinal partitions 14 are provided within the container and these may be formed of frames 15 of woven wire suitably tied at 16, to the frame 2 and covered with a coating of cement or the like. The partitions 14 terminate short of the central axis of the apparatus to leave a central free or uninterrupted passage from the inlet 18 to the outlet 19 of the container (see Fig. 4). It will be observed that the entrant and exit ends 21 and 22 of the container are of hemispherical form or shape for a purpose hereinafter elucidated.

The retort is mounted on a suitable cradle or other convenient means, formed by rollers 23 suitably supported at 24, and the container may be turned in any desired manner, as for example, by rollers 25 on a shaft 26 that is mounted in bearings 27 and is driven by a pulley 28 from any convenient source of power (not shown).

In the use of my apparatus as an ore-recovering plant two containers 30—31 are provided, one of which 30, forms the crushing, drying and desulfurizing and heating container and the other 31 serving as the solution container. In the solution container the crusher lining 13 of ore is preferably omitted. The construction of both containers 30—31 is the same, excepting that I prefer to make the crushing container 30 of an elongated structure, while the solution container has no apparent elongation but is substantially spherical in shape. When a substantially true globular or spherical container 31 is used it is preferably provided with a flattened zone 32 at right angles to its axis so that it may be rolled along the ground and still maintain its axis, which runs from the center of the inlet 33 to the center of the outlet 34, horizontal. In practice, the outlet 19 of the first container 30 and the inlet 33 of the second container 31 are held in close juxtaposition, they being spaced slightly apart, however, to leave an air inlet passage 35 between the two containers the volumn of which may be regulated by the slidable collar 36. The solution 37 may be introduced into the container 31 in any desired manner, preferably by a pipe 38 which is jointed at 39 to be swung out of the way when the container 31 is to be rolled away from the container 30.

When the invention is to be used with powdered fuel, coal, coke or wood and brush, I arrange the apparatus somewhat as indicated in Fig. 6 of the drawings, by reference to which it will be observed that the fuel 40 is introduced into the container and a blower 41 of any approved type is provided to create the necessary draft. A suitable frame or support 42 is provided which may be used either as a convenient means on which the ore may be introduced into the container or it may be used as a grate for cord wood, when such is used for fuel.

In operation when it is desired that my invention be used in the treatment of ores bearing precious metals, the ore is introduced into the container 30 and the fuel ignited to raise the temperature within the container 30 to about 500° F. I prefer, when possible, to use a liquid fuel burner or a burner that will produce a flame somewhat of the type indicated in the drawings, whereby the central passage from the inlet to the outlet will be the heat zone. After the fuel has been ignited to produce the heat zone, the container 30 is set in motion to turn it on its horizontal axis, thus causing the partitions 14 to lift the ore 43 and drop it through the hot blast flame whereby the temperature of the ore will be raised to a high degree, namely,—about 500° F. and thus cause its water of crystallization to be driven off and also cause those volatile products contained in the ore to be separated therefrom. Any sulfur in the ore is removed in this way. The removal of the volatile products in the ore while passing through the heat zone causes decrepitation to take place and the ore becomes porous and soft so that when it contacts the bottom of the container it will be broken and crumbled; the breaking and crumbling action is also assisted by the rolling and tumbling of the ore within the container during its movements, the heavier and lesser heated ores serving to assist in crushing the softer particles until the ore is reduced to a fine powder or dust. The force of the heated blast serves to cause the crushed particles of ore to gradually work toward the outlet 19 of the container and as soon as the ores have been crushed fine enough the heated blast will carry the ore particles through the outlet 19 into the second container 31 where the hot ore particles are deposited into the solvent. The container 31 being provided with partitions 44 will serve to agitate the solution within the container 31 and as the hot ore particles are directly deposited in such solution the temperature within the container 31 will be maintained at the desired degree. The air opening between the containers 30 and 31 is so regulated that the temperature within the container 31 will be about 200 or 212° F. so as to prevent the boiling of the solvent and yet allow sufficient heat to assist the chemical re-action. As soon as a sufficient quantity of ore is deposited in the solution in the container 31 the same is rolled away and another container rolled into place in lieu of the one rolled away. The container containing the ore in solution that has been rolled away is taken to a suitable opening over a discharge pipe and inverted to discharge the contents of the container which are then subjected to forced percolation by steam or vacuum and the values extracted, preferably while hot. As soon as the contents of the container have been removed the container will be ready to be used again as soon as desired. The ore values are recovered from the solvent after it has been removed from the container 31 in the usual way.

While my apparatus is particularly adapted for use in the treatment of ores bearing precious metals and the like, it may with slight modifications, that will be obvious to those skilled in the art, be used in the manufacture of cement, or for other purposes than those described and I do not wish it understood that it is intended that my apparatus be merely used for the specific purposes herein described but its use is not limited, and it may be used wherever convenient and for whatever purpose to which it may be adapted.

By making the container 30—31 of hemispherical form at the ends, the rebound of the dropped ore or liquids will be toward the center of the container and hence the contents of the same will not jump out. The speed at which the containers are turned on their axis will depend upon the conditions met with in practice, a slow turning, however, being sufficient to effect the results desired under ordinary conditions.

From the foregoing taken in connection with the accompanying drawings, it is believed the complete construction, operation, and numerous advantages of the invention will be readily apparent to those skilled in the art to which the invention appertains and I desire it understood that I do not limit myself to the precise details of construction herein-described and disclosed in the drawings and slight changes and modifications may be made to adapt the invention to its various uses without departing from the spirit of the invention or the scope of the appended claims.

What I claim is:

1. An apparatus of the class described comprising a container including a body having hemispherical ends and provided with an inlet and an outlet at said ends, and longitudinal partitions within said body to lift the contents of the body, and means for turning said body on a horizontal axis.

2. In an apparatus of the character described, a container, having an inlet and an outlet, a receptacle having an inlet adjacent to the outlet of said container, means for simultaneously heating and pulverizing ore within said container and then delivering the hot pulverized ore from said container into said receptacle, and means for admitting air to the heated stream as it passes from the container into the receptacle to maintain a constant temperature within said receptacle.

3. An apparatus of the character described composed of a body having hemispherical ends provided with openings forming an inlet and an outlet, means for providing a hot blast stream from the inlet to the outlet, and means for lifting the contents of said body and dropping them through said stream.

4. An apparatus of the character described composed of a body having hemispherical ends provided with openings forming an inlet and an outlet, means for providing a hot blast stream from the inlet to the outlet, means for lifting the contents of said body and dropping them through said stream, and an internal lining for said body forming a crusher against which the contents of said body are dropped.

5. In an apparatus of the character described, a container having a crusher lining, means for dropping and tumbling ore within the said container, against said lining, said container having an outlet, a receptacle having an inlet in alinement with the outlet of said container, means for admitting air between said container, and said receptacle to enter said receptacle, and a single means within said container for simultaneously heating and drying said ore while it is being dropped and tumbled and then conveying the crushed and dried ore from said container in said receptacle.

6. In an apparatus of the character described, a container having a crusher lining, means for dropping and tumbling ore within said container against said lining, and a single means for simultaneously heating and drying said ore while it is being dropped and tumbled and then conveying the crushed and dried ore from said container.

7. In an apparatus of the class described, a first and a second container, each having an inlet and an outlet, the outlet of the first container being held to deliver into the inlet of the second container, means for producing a hot blast from the inlet to the outlet of the first container, and means for lifting ore around said blast and dropping it through said blast said blast serving to deliver the pulverized ore from said first into said second container.

8. In an apparatus of the class described, a first and a second container, each having an inlet and an outlet, the outlet of the first container being held to deliver into the inlet of the second container, means for producing a hot blast from the inlet to the outlet of the first container, means for lifting ore around said blast and dropping it through said blast, said container including means for causing the dropping ore to rebound toward the center of the container.

9. In an apparatus of the class described, a first and a second container, each having an inlet and an outlet, the outlet of the first container being held to deliver into the inlet of the second container, means for producing a hot blast from the inlet to the outlet of the first container, means for lifting ore around said blast and dropping it through said blast, said blast serving to deliver the finely crushed ore from said first container into said second container, and means in said second container for retaining the ore so delivered.

10. In an apparatus of the class described, a first and a second container, each having an inlet and an outlet, the outlet of the first container being held to deliver into the inlet of the second container, means for producing a hot blast from the inlet to the outlet of the first container, means for lifting ore around said blast and dropping it through said blast, said container including means for causing the dropping ore to re-bound toward the center of the container, said blast serving to deliver the finely crushed ore from said first container into said second container, and means in said second container for retaining the ore so delivered.

11. In an apparatus of the character described, a container having an inlet and an outlet, means for establishing a hot blast from the inlet to the outlet of said container, means within said container for lifting ore around said blast and dropping it through said blast to be heated and dried thereby, said container including a crusher lining on which said ore is dropped.

12. In an apparatus of the character described, a container having an inlet and an outlet, means for establishing a hot blast from the inlet to the outlet of said container, means within said container for lifting ore around said blast and dropping it through said blast to be heated and dried thereby, said container including means causing said dropped ore to re-bound toward the center of said container and away from the inlet and outlet thereof.

13. In an apparatus of the character described, a container having an inlet and an outlet, means for establishing a hot blast from the inlet to the outlet of said container, means within said container for lifting ore around said blast and dropping it through said blast to be heated and dried thereby, said container including a crusher lining on which the ore is dropped, said container including means causing said dropped ore to re-bound toward the center of said container and away from the inlet and outlet thereof.

14. In an apparatus of the character described, a first and a second container each having an inlet and an outlet, the first container outlet and the second container inlet being held in close juxtaposition but spaced apart to afford an air opening, means for establishing a hot blast from the inlet to the outlet of said first container, means for turning said containers on an axis passing from the inlet to the outlet, and means within the first container for crushing said ore and passing it through said hot blast to be delivered by said blast into said second container.

15. In an apparatus of the character described, a first and a second container each having an inlet and an outlet, the first container outlet and the second container inlet being held in close juxtaposition but spaced apart to afford an air opening, means for establishing a hot blast from the inlet to the outlet of said first container, means for turning said container on an axis passing from the inlet to the outlet, means within the first container for crushing said ore and passing it through said hot blast to be delivered by said blast into said second container, and a solvent in said second container into which said heated and crushed ore is delivered.

16. In an apparatus of the character described, a first and a second container each having an inlet and an outlet, the first container outlet and the second container inlet being held in close juxtaposition, means for establishing a hot blast from the inlet to the outlet of said first container, means for turning said container on an axis passing from the inlet to the outlet, means within the first container for crushing said ore and passing it through said hot blast to be delivered by said blast into said second container, and means for cooling said heated and crushed ore as it passes from the first to the second container to maintain a constant temperature in said second container below the temperature in said first container.

17. In an apparatus of the class described a first container having an inlet and an oppositely disposed outlet, means for establishing a hot blast between said inlet and said outlet to deliver the powdered and crushed contents of said container through the outlet of the same, means for turning said container around an axis passing from the inlet to the outlet, and means within said container for lifting the contents thereof above said blast and dropping them through said blast to be heated thereby.

18. In an apparatus of the class described a first container having an inlet and an oppositely disposed outlet, means for establishing a hot blast between said inlet and said outlet to deliver the powdered and crushed contents of said container through the outlet of the same, means for turning said container around an axis passing from the inlet to the outlet, means within said container for lifting the contents thereof above said blast and dropping them through said blast to be heated thereby, and a hardened lining for said container onto which the contents of said retort are dropped and tumbled to crush and pulverize said contents.

ISAAC A. BRADDOCK.

Witnesses:
DAVID E. ANTHONY,
WM. S. ARMSTRONG, Jr.

Copies of this patent may be obtained for five cents each, by addressing the "Commissioner of Patents, Washington, D. C."